3,397,193
ACRYLIC ELASTOMER
Romeo Raymond Aloia and Samuel Kaizerman, New Brunswick, N.J., assignors to American Cyanamid Company, Stamford, Conn., a corporation of Maine
No Drawing. Filed Oct. 21, 1964, Ser. No. 405,579
10 Claims. (Cl. 260—80.81)

ABSTRACT OF THE DISCLOSURE

A vulcanizable elastomeric terpolymer having good low temperature flexibility and oil resistance properties. The terpolymer comprises at least 90% of a mixture of butyl acrylate and 2-cyanoethylacrylate, of which between 5% and 50% is 2-cyanoethylacrylate, polymerized with a monomer containing at least one vinyl group and at least one chlorine atom capable of acting as a cross-linking site.

---

This invention relates to, and has for its object, new vulcanizable acrylic elastomers. More particularly, it relates to elastomeric terpolymers of butyl acrylate, cyanoethyl acrylate and a vinyl compound containing vulcanizable, i.e., cross-linking sites such as active halogen or epoxide groups.

Specialty elastomers, particularly those based on copolymers of ethyl acrylate, and a minor proportion of a copolymerizable chlorine-containing monomer, such as vinyl chloroacetate, 2-chloroethyl vinyl ether or 2-chloroethyl acrylate, are known. These elastomers, used quite often as gaskets, seals, valve seats and the like, have excellent resistance to heat and are also highly resistant to mineral oils, ozone, ultraviolet light, flexural breakdown, compression set and gas diffusion. However, they are deficient in low temperature properties, i.e., they tend toward embrittlement at low temperatures.

It is known that desirable low temperature properties are obtainable from copolymers of butyl acrylate and chlorine-containing monomers. While these copolymers are satisfactory in this respect, they unfortunately are deficient in oil resistance. Satisfactory elastomers are not obtained by using a mixture of ethyl and butyl acrylates in combination with an active halogen-containing vinyl monomer. Because gasketing and sealing materials can be expected to encounter both low temperatures and oil environment in their lifetimes, satisfactory performance in both areas is essential. It is thus quite confining to have to choose a material lacking in either low temperature or oil resistance.

It is an object of this invention to provide an acrylic elastomer which is capable of withstanding low temperatures and yet have good resistance to oil as well as to other influences such as light, heat, ozone, etc. Other objects will be apparent from the following description.

It has now been discovered that elastomers of the acrylic type having excellent resistance to oil and low temperature embrittlement can be provided. These elastomers are terpolymers of butyl acrylate, 2-cyanoethyl acrylate and a third monomer containing at least one copolymerizable vinyl group and at least one chlorine atom capable of acting as a cross-linking site.

The terpolymer contains between 1% and 10%, preferably between 2% and 5%, of the vinyl monomer having a cross-linking site. The remainder of the terpolymer, i.e., between 99% and 90%, preferably between 98% and 95%, comprises a combination of butyl acrylate and 2-cyanoethyl acrylate, of which between 5% and 50%, and preferably from 10% to 30%, is 2-cyanoethyl acrylate.

The "cross-linking" monomer should have halogen atoms as cross-linking or vulcanizable sites. Representative vinyl monomers having reactive halogens (preferably chlorine) include vinyl chloroacetate, vinyl 2-chloroethyl ether, 2-chloroethyl acrylate, etc. The preferred "cross-linking" monomer is vinyl chloroacetate.

The terpolymers may contain other monomers in very small amounts in order to enhance the properties of the elastomer. For example, small amounts of butylene dimethacrylate may be used to obtain elastomers of increased toughness and higher Mooney viscosities.

The terpolymers of this invention are prepared by well-known methods. Either emulsion or suspension types of polymerization may be used. Conventional catalysts are employed.

The terpolymer should contain between 0.4% and 3.0%, preferably between 0.6% and 2.0%, of chlorine.

The elastomeric terpolymers of this invention can be vulcanized by curing agents normally used for elastomers containing chlorine cross-linking sites. For example, ammonium salts of weak acids, alone or in combination with alkyl halides, may be used to cure the elastomers of this invention containing active halogens, especially those having vinyl chloroacetate as the halogen-containing monomer.

The terpolymers of this invention may be compounded with the additives normally used in compounding elastomers, such as carbon black or other pigments, antioxidants, stearic acid, lubricants, etc.

In the following examples, the parts and percentages are by weight.

Example 1.—95% 80/20 BA[1]/CEA[2], 5% VCA[3]

A solution of 10 parts of sodium lauryl sulfate and 5 parts of sodium stearate is brought to about 60° C. in a suitable reaction vessel and air in the system is displaced with nitrogen. Thereto, 41 parts of cyanoethyl acrylate, 164 parts of butyl acrylate, and 45 parts of vinyl chloroacetate are added with stirring followed by 5 parts of potassium persulfate. After a few minutes, a mixture of 149 parts of cyanoethyl acrylate, 596 parts of butyl acrylate and 5 parts of vinyl chloroacetate is added over a period of about 60 minutes. The resulting latex is coagulated by the addition of aluminum sulfate and the polymer separated and washed. The dried terpolymer contains about 1.0% chlorine.

Example 2.—95% 85/15 BA/CEA, 5% VCA

A mixture of 174.3 parts of butyl acrylate, 30.8 parts of cyanoethyl acrylate, 45 parts of vinyl chloroacetate, 0.75 part of butylene dimethacrylate and 2 parts of benzoyl peroxide is added to a suspension of 5 parts of bentonite and 15 parts of tricalcium phosphate in 2,000 parts of water containing 0.1 part of a surface-active agent of the sodium alkyl-arylsulfonate class. While stirring at a temperature of 85° C., a mixture of 633 parts of butyl acrylate, 111.8 parts of cyanoethyl acrylate, 5 parts of vinyl chloroacetate and 2.3 parts of butylene dimethacrylate is added over 60 minutes. The temperature is maintained at 85° C. for 15 minutes, and the temperature is then raised to 99° C. over 20 minutes. After cooling, the suspension of terpolymer is separated and washed by decantation, filtered and dried at 70° C. The terpolymer product has a chlorine content of about 0.75%.

Example 3.—95% 87.5/12.5 BA/CEA, 5% VCA

A mixture of 179.4 parts of butyl acrylate, 25.6 parts of cyanoethyl acrylate, 45 parts of vinyl chloroacetate and 2 parts of benzoyl peroxide is added to a suspension of 5 parts of bentonite and 15 parts of tricalcium phosphate in 1,000 parts of water containing 0.1 part of a surface-active agent of the sodium alkylarylsulfonate class while stirring at a temperature of 85° C. A mixture of 651.6

---

[1] Butyl acrylate.
[2] Cyanoethyl acrylate.
[3] Vinyl chloroacetate.

parts of butyl acrylate, 93.4 parts of cyanoethyl acrylate and 5 parts of vinyl chloroacetate is then added simultaneously with 1,000 parts of water over a 60 minute period at a temperature of 85° C. Stirring is continued at 85° C. for 60 minutes and the temperature is raised to 99° C. over 20 minutes. After cooling, the terpolymer is separated, washed and dried as in Example 2. The product has a chlorine content of about 0.95%.

Example 4.—95% 90/10 BA/CEA, 5% VCA

A mixture of 184.5 parts of butyl acrylate, 20.5 parts of cyanoethyl acrylate, 45 parts of vinyl chloroacetate, 0.75 part of butylene dimethyacrylate and 2 parts of benzoyl peroxide is added to a suspension of 5 parts of bentonite and 15 parts of tricalcium phosphate in 2,000 parts of water containing 0.1 part of a surface-active agent of the sodium alkylarylsulfonate class while stirring at a temperature of about 85° C. A mixture of 670.5 parts of butyl acrylate, 74.5 parts of cyanoethyl acrylate, 5 parts of vinyl chloroacetate and 2.3 parts of butylene dimethacrylate is then added over a period of about 30 minutes at a temperature of 85° C. Stirring is continued at 85° C. for 45 minutes and the temperature is then raised to 99° C. over 25 minutes. After cooling, the terpolymer is separated, washed and dried as in Example 2. The terpolymer has a chlorine content of about 0.8%.

Example 5

Each of the terpolymers prepared by the procedures of Examples 1–4 is compounded on a conventional rubber mill by the formulas of Table I. The compounded elastomers are cured at 165° C. for the time shown. They are also post-cured for 16 hours at 150° C. The tensile strength, elongation, modulus and hardness are shown in the same table. The "brittleness temperature" is determined by ASTM test D746–57T. The "oil absorption" is measured by ASTM test D471–55T, and is shown as percent volume swelling when immersed in ASTM Oils Nos. 1 and 3.

We claim:

1. A vulcanizable elastomeric terpolymer comprising at least 90% of a mixture of butyl acrylate and 2-cyanoethyl acrylate, of which between 5% and 50% is 2-cyanoethyl acrylate, polymerized with a monomer containing at least one vinyl group and at least one chlorine atom capable of acting as a cross-linking site.

2. The terpolymer of claim 1 wherein the monomer is vinyl chloroacetate.

3. A vulcanizable elastomeric terpolymer comprising between 95% and 98% of a mixture of butyl acrylate and 2-cyanoethyl acrylate, of which between 10% and 30% is 2-cyanoethyl acrylate, polymerized with between 2% and 5% of vinyl chloroacetate.

4. A vulcanizable elastomeric polymer comprising at least about 90% of a mixture of butyl acrylate and 2-cyanoethyl acrylate, of which between 5% and 50% is 2-cyanoethyl acrylate, polymerized with a sufficient amount of vinyl chloroacetate to produce in the polymer a chlorine content of from about 0.4% to about 3.0%.

5. The composition of claim 4 wherein the chlorine content is from about 0.6% to about 2.0%.

6. A vulcanized elastomer of the composition of claim 1.

7. A vulcanized elastomer of the composition of claim 2.

8. A vulcanized elastomer of the composition of claim 3.

9. A vulcanized elastomer of the composition of claim 4.

10. A vulcanized elastomer of the composition of claim 5.

TABLE I

| Product of Example | 1 | 2 | 3 | 4 |
|---|---|---|---|---|
| Polymer | 100 | 100 | 100 | 100 |
| Carbon Black FEF | 50 | 50 | 50 | 50 |
| Stearic Acid | 1 | 2 | 2 | 2 |
| Ammonium Benzoate | 4 | 4 | 4 | 4 |
| Dodecyl Bromide | 2 | 2 | 2 | 2 |
| Phenyl-beta-naphthylamine | 2 | 2 | 2 | 2 |
| Curing Time, minutes | 9 | 13 | 9 | 10 |
| Tensile Strength, p.s.i | 1,405 | 1,155 | 1,280 | 1,155 |
| Elongation, percent | 245 | 110 | 120 | 145 |
| Modulus, 100%, p.s.i | 483 | 1,040 | 1,080 | 845 |
| Hardness, Shore A | 68 | 74 | 67 | 69 |
| Brittleness, Temp., °C | −32 | −29 | −36 | −35 |
| Oil Absorption No. 1, percent | 1.6 | 2.2 | 4.7 | 3.2 |
| Oil Absorption No. 3, percent | 22.6 | 32.5 | 37.8 | 46.9 |

References Cited

UNITED STATES PATENTS 2,412,476  12/1946  Semegen _____ 260—83
2,492,170  12/1949  Mast et al. _____ 260—86.1
3,201,373  8/1965   Kaizerman _____ 260—79.5

JOSEPH L. SCHOFER, *Primary Examiner.*

S. M. LEVIN, *Assistant Examiner.*